May 26, 1936.  W. M. McCASKELL  2,042,070
BAKING PLATE AND METHOD OF USING THE SAME
Filed Oct. 5, 1934
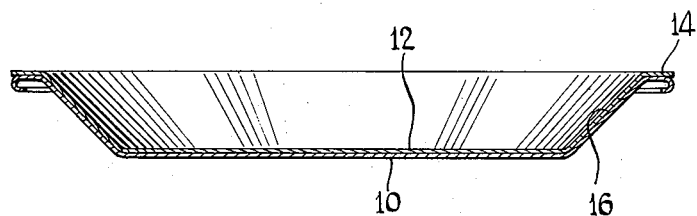
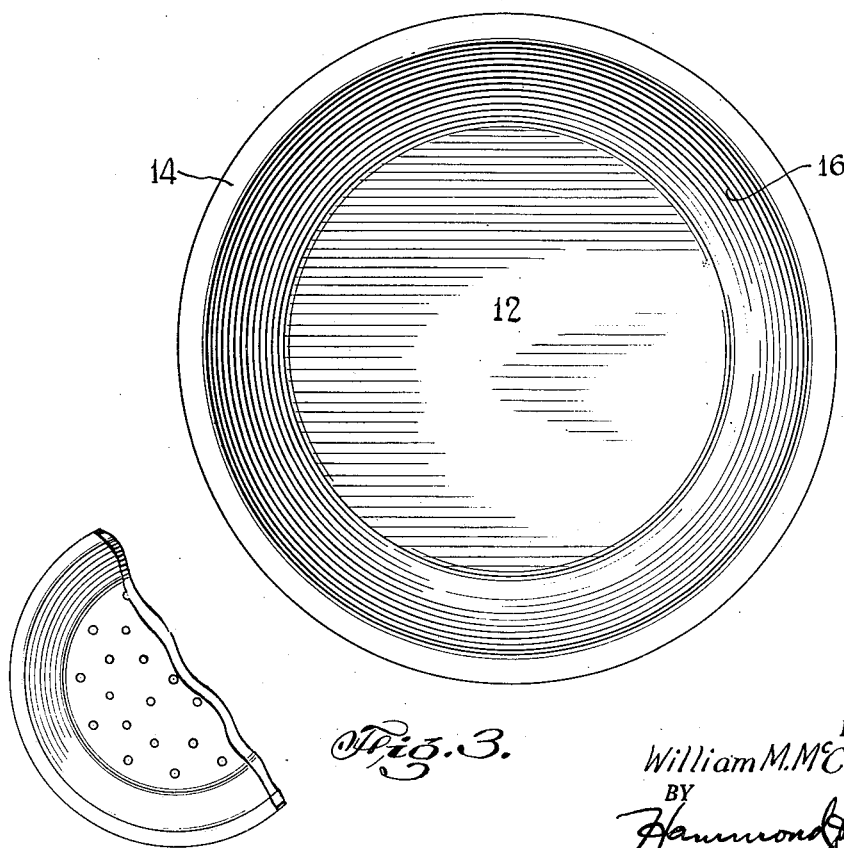
INVENTOR.
William M. M<sup>c</sup>Caskell Patented May 26, 1936

2,042,070

UNITED STATES PATENT OFFICE 2,042,070

BAKING PLATE AND METHOD OF USING THE SAME

William M. McCaskell, Philadelphia, Pa.

Application October 5, 1934, Serial No. 746,945

4 Claims. (Cl. 53—6)

This invention relates to improvements in baking and cooking utensils and more particularly it relates to an improved method and apparatus for baking pies and similar products.

It has heretofore been the practice in making pies on a commercial scale to form the crust in a metal pie plate, introduce the ingredients and cook in a suitable oven and then after the pie was baked, it was either delivered in the metal pie plate to the consumer and the plates subsequently reclaimed or the pie was removed to a separate fibre or cardboard slip plate which was of such little value that is could subsequently be destroyed. If the pies were delivered in metal plates, the delivery expense was rather large as the plates were often mishandled and frequently destroyed for further use by the prevalent practice of cutting the pies in the plate. This breaks the rust-proofed surface and soon the plates are unfit for further use. Such plates of necessity had to be carefully washed and regreased before each baking.

An alternative of delivery in the metal plates, is to use slip plates into which the pies are transferred. The pies cannot be efficiently baked in them, due to the slip plates in commercial use at present being made of ordinary paper board that chars at baking temperatures, also the slip plates are insufficienly strong to support a pie. Furthermore, the transfer of pies to slip plates is difficult, time consuming and in many cases, breakage of the pie occurs although the bakers have used the expedient of making the bottom crust thick until the pie is nearly self-sustaining.

I have found that I can provide a thin paper lining for pie plates which eliminates many of the above difficulties and is still sufficiently strong to permit usual handling of the pie, yet is light enough not to hinder baking. It may be opaque and will retain its clean color and be entirely sanitary. Furthermore, it is sufficiently cheap and inexpensive so that it can be discarded after one use.

It is one of the features of my invention to provide a treated paper or pulp product in such a manner that it will serve as a liner for a pie plate during baking and which will not become discolored by the heat or the juice from the pies so that it may be used as an independent and sanitary supporting medium during transfer of the pie from bakery to consumer, without appearing discolored, unsightly or unsanitary.

Another object of my invention is to provide a new method of baking pies by forming a thinner pie crust in a paper product lined dish so that as the pie is finished, it may be transported and supported jointly by the strength of the pie crust and of the inner paper liner, together with the tin baking plate or a tinned metal pie plate apart from the cooking utensil.

Another object of my invention is to provide a fibrous liner for a pie plate which is hard and sanitary, yet thin and heat responsive and which is provided with a heat resisting element to prevent charring or visible discoloring during cooking.

Further objects of my invention will appear from the following description thereof, taken in connection with the attached drawing illustrating a preferred form of embodiment thereof, and in which:

Figure 1 is a central vertical section through the improved pie plate and liner, Figure 2 is a top plan view of the pie plate and liner; and Figure 3 shows a part of a perforated plate.

A typical pie plate of the metal variety is shown in Figure 1 and has the flat bottom 10, in which I prefer to insert a liner 12 having a peripheral rim 14, surmounting the outwardly slanting walls 16. This liner is intended to fit close to the plate 10 and to support the pie crust and ingredients when ready for baking.

I prefer to use an opaque fibre board which is unaffected by baking temperatures. The thickness of the paper may vary depending on the rigidity desired and a rather thin board is usually sufficient. I have found that 25 point is satisfactory but thinner chemically treated paper can be used. The caliper of the liner will depend on the desired rigidity but the liner should normally be sufficiently rigid to support a cooked pie for transportation and ordinary handling free of any other plate or other supporting medium.

The liner may be molded or stamped into the proper shape in the customary manner of forming pulp products and it may be bleached or unbleached material. The unbleached is structurally sufficient and cheaper, although for superior products, having a better appearance, the bleached pulp is probably better. I prefer to use the white liner and one which is unaffected by the normal heat of baking temperatures. The addition of sodium silicate is desirable for this purpose.

The fibre board may also be hard or soft as to surface and if desired, it may be treated with a pigment or coloring matter for appearance and to resist discoloration by fruit acid and the like provided the rate of heat transfer is not reduced. Titanium dioxide is suitable for such purpose and may be sprayed on in a suitable vehicle or impregnated in the unfinished pulp or fibre board.

If desired, the liner may be perforated on the bottom and sides or on the bottom alone. It is to be understood that baking of pies can be carried out only under a limited period of time and heat before the top crust is done and it is essential that the cooking of the bottom crust be completed in time. I find however, that the use of the fibre liner makes it possible to use less dough for the bottom crust as the pie need not be entirely self-supporting as is necessary in prior constructions where the pie was transferred from the pie plate. This thinner crust is of course more rapid in cooking and is more tasty and generally satisfactory as well as being cheaper.

Under normal circumstances, pies baked in the liner are baked with equal or greater speed than without the liner and all further handling is eliminated. The baked pie and supporting liner are removed from the metal plates 10 and are transported to the consumer who cuts and serves the pie and throws the liner away. During cooking it is not necessary to grease the tin pie plate and the cooking plate never leaves the bakery. It is not damaged in any way, requires practically no cleaning for reuse and all expense for collection of used pie plates is avoided. The pies are not broken during transfer and the liner has all the advantages of other plates, yet as it only independently supports the pie after cooking, the fibre liner is less expensive and of less thickness and requires less special treatment than the usual fibre baking plates.

The liner is sanitary and although it may be absorbent for greases of the crusts, it may also be made non-absorbent, if desired, especially where special conditions require it. It especially eliminates crust toughness and sogginess normally prevalent with metal plates. Furthermore, it does not adhere to the metal plate although it should closely fit the plate. It is independently self sustaining so that no special handling of the liner is required after the pie is cooked or in holding in place while the crust is being inserted.

The use of liners of fibrous materials for cooking of pies is especially beneficial as pies can then have relatively thinner crusts supporting the liquid or semi-liquid and usually not self sustaining centers. These are to be distinguished from cakes, breads and other pastries which are self sustaining throughout when cooked. It is essential therefore that the liner aid the crust to adequately carry the pie. I am not limited however, to such use, for the liner may be used in cooking of other ingredients than pies if it should be so desired.

I also do not want to be limited to any specific quality of paper or pulp as I am aware that many modifications may be made thereto and I desire a broad interpretation of my invention within the scope and spirit of the description herein and of the claims appended hereinafter.

I claim:

1. In the art of cooking and transporting pies on a commercial scale, the improvement in method which consists of lining the usual metal plate with a non-charring fibre liner, cooking a pie in said liner and subsequently transporting said pie in said liner separate and apart from said plate, said liner permitting the use of thinner dough and facilitating the cooking of the pie.

2. A fibre shipping plate for transporting cooked pie, such plate being of such strength that it will independently support a cooked pie so that it may serve as a shipping medium, such plate being of such thinness that it does not materially impede heat transfer from a source of heat through a metal baking plate, said fibre plate being relatively weak with respect to uncooked pie and requiring a baking plate support, said fibre plate being normally supported during baking operations and normally supporting the pie during shipment.

3. A fibre shipping plate for transporting cooked pie, such plate being of such strength that it will independently support a cooked pie so that it may serve as a shipping medium, such plate being of such thinness that it does not materially impede heat transfer from a source of heat through a metal baking plate, said fibre plate being relatively weak with respect to uncooked pie and requiring a baking plate support, said fibre plate being normally supported during baking operations and normally supporting the pie during shipment, said fibre plate being impregnated with a heat resisting medium and being of a shape to closely fit the supporting metal plate whereby the ingredients of the pie to be cooked are spaced from the metal plate by but a single thickness of the fibre plate.

4. A fibre shipping plate for transporting cooked pie, such plate being of such strength that it will independently support a cooked pie so that it may serve as a shipping medium, such plate being of such thinness that it does not materially impede heat transfer from a source of heat through a metal baking plate, said fibre plate being relatively weak with respect to uncooked pie and requiring a baking plate support, said fibre plate being normally supported during baking operations and normally supporting the pie during shipment, said fibre plate being impregnated with a heat resisting medium and being of a shape to closely fit the supporting metal plate whereby the ingredients of the pie to be cooked are spaced from the metal plate by but a single thickness of the fibre plate, said fibre plate being opaque, white and having a high coefficient of heat transfer.

WILLIAM M. McCASKELL.